June 30, 1953     A. P. DOUGLAS ET AL     2,643,917
WHEEL
Filed Sept. 13, 1950
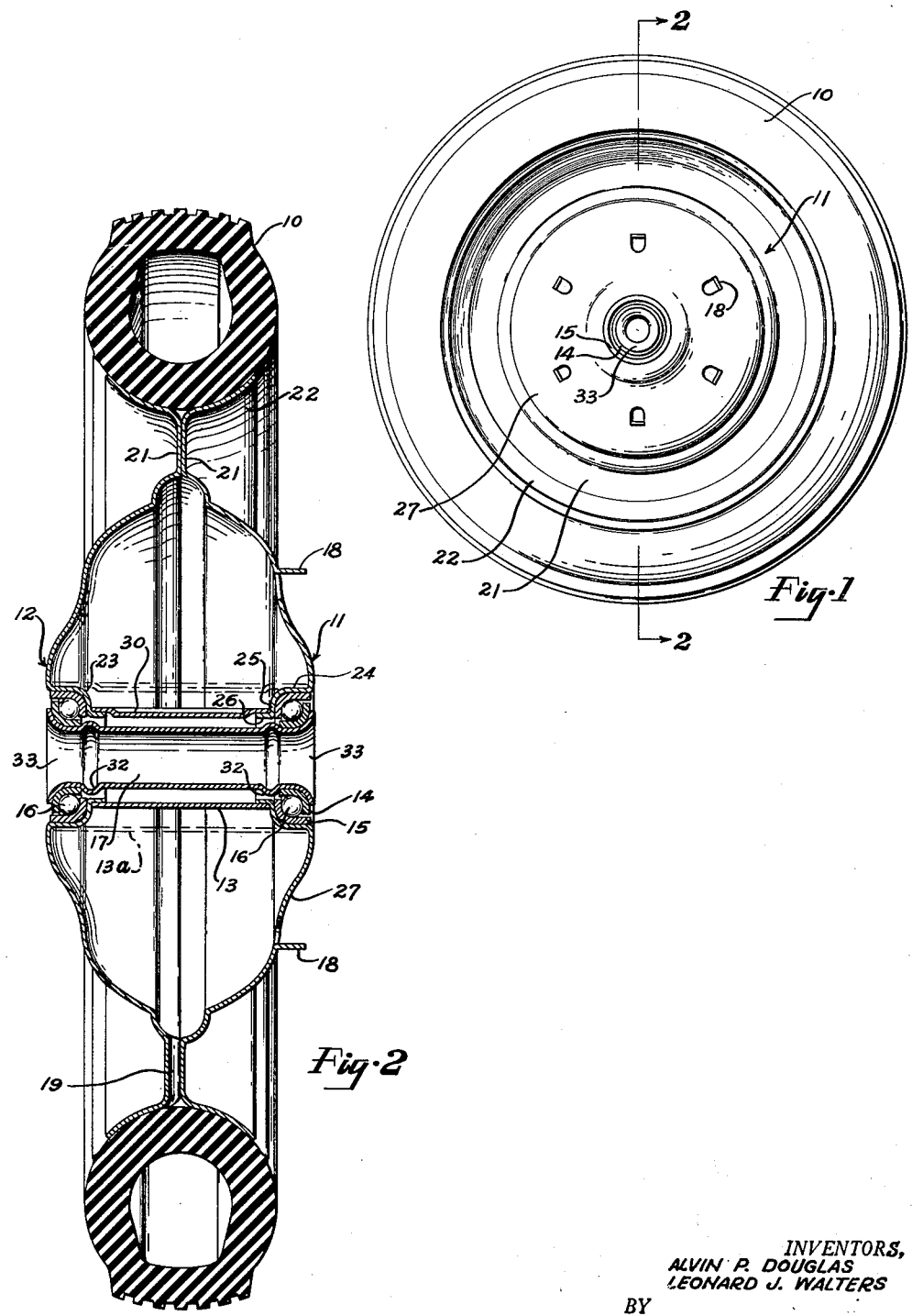
INVENTORS,
ALVIN P. DOUGLAS
LEONARD J. WALTERS
BY
Fay, Golrick & Fay
ATTORNEYS Patented June 30, 1953

2,643,917

UNITED STATES PATENT OFFICE 2,643,917

WHEEL

Alvin P. Douglas, Cleveland, and Leonard J. Walters, Shaker Heights, Ohio, assignors to The Murray Ohio Manufacturing Company, Cleveland, Ohio, a corporation of Ohio Application September 13, 1950, Serial No. 184,621

2 Claims. (Cl. 301—63)

This invention relates to an improvement in the structure of wheels, particularly wheels for juvenile vehicles, toys and the like.

The general object of this invention is the provision of a simple, strong pressed metal structure for wheels.

Another object is the provision of a wheel structure adapted to manufacture by mass production methods at low cost.

Another object is the provision of a wheel adapted to the use of an improved ball bearing structure.

Still further objects and advantages will appear in the following description and drawings in which Fig. 1 is a side view in elevation of the wheel of this invention; and Fig. 2 is a cross-section taken along the line 2—2 of Fig. 1.

The improved wheel shown in the drawings comprises a tire 10; a pair of similar, centrally apertured, outwardly dished rim-flanged outer and inner disks 11 and 12 formed of pressed metal, which are joined by spot welding or other suitable means as hereinafter explained; a tubular disk spacer 13 disposed coaxially between the disks; inner and outer bearing races 14 and 15 with bearing balls 16 therebetween; and an inner race retainer sleeve or axle sleeve 17. The inner disk 12 and outer disk 11 are of like shape with the minor differences that the outer disk 12 is provided with a series of nibs 18 adapted to be bent over the edge of a hub cap to retain it on the wheel, while the inner disk is provided with radially extending drainage grooves 19.

In Fig. 2 it may be clearly seen that each disk has a circular flat joining section 21 extending concentrically around the disk, a curved rim flange 22 projecting laterally from the outer circumference of the joining section 21. At the central portion of each disk an inwardly extending bearing socket 23 is formed with a cylindrical wall 24 and a shoulder or bottom 25 having a central aperture with a cylindrical extension or inwardly extending tubular flange 26. The bearing socket is dimensioned to receive the outer race 15 by press-fitting, the axial position of the race being determined by the socket bottom. As is clearly shown in Fig. 2, the wall portion 24 and the bottom portion 25 of the bearing socket formation merge into each other at a curved portion, and the outer surface of the outer race 15 is conformed in shape to the adjacent portions of the bearing socket formation. The inner circumference of the joining section 21 is connected to the wall 24 of the bearing socket by a web 27 which is suitably contoured for structural rigidity and decorative effect.

The hub portions of the disk are held apart by the tubular disk spacer 13, which may be provided with longitudinal strengthening ridges 30. The ends of the spacer abut against the bottom 25 of the bearing socket with the tubular flanges 26 extending into the end opening to retain the spacer in position. The disks are held together at the joining sections 21 by spot-welds or other suitable fastening means. Alternatively, as shown by the dashed lines in Fig. 2, a tubular spacer 13a may be used with ends disposed about the bearing socket walls 24 and bearing against the webs 27.

The tubular axle sleeve 17, which serves as an inner race retainer and spacer, is provided with spaced circumferential ridges 32 which axially space the inner bearing races, while the ends 33 are flared outwardly against the cylindrical and outer end surfaces of the inner races to retain them in spaced relation against ridges 32.

In the production of the wheel, the disks 11 and 12 are formed of sheet metal, such as sheet steel, by the methods known to the metal working art, for example by stamping and drawing in progressive dies. One of the disks is then placed in a holding fixture with the inner side up, the spacer sleeve is slipped over the bearing socket structure, the second disk is placed on the upper end of the sleeve and the two disks, clamped in proper position, are then fastened together by spot welding along 21. The disk part of the wheel may be painted at this stage. Thereafter the tire 10 is placed on the rim structure constituted of the two rim flanges 22, by expanding it slightly and rolling it on to the rim. Outer bearing races 21 are next pressed into place in the two bearing sockets. An axle sleeve, with ends unflared and fitted at one end with an inner race, is placed in a suitable fixture and maintained upright with the inner race in the bottom-most position, while the successive operations are performed of placing the requisite number of balls 16 in the inner race, positioning the wheel with outer races already pressed in place over the axle sleeve in the fixture, fitting the second inner race over the top end of the sleeve 17, inserting the proper number of balls between and upper-most inner and outer races, and lastly simultaneously expanding the ends of the sleeve 17 outwardly against the inner races.

We claim:

1. A wheel for juvenile vehicles and the like comprising a pair of similarly shaped, outwardly dished sheet metal side disks joined to each other on their inner sides adjacent rim formations thereon, each of said disks having a flat joining portion concentric to the wheel axis, a rim flange extending outwardly from the outer circumference of the said joining portion, an inwardly extended bearing socket formed in the center portion of the disk having a cylindrical side wall and a centrally apertured shoulder, said shoulder being provided with an integrally formed inward cylindrical extension about the aperture of said shoulder, and a web connecting the said joining portion to said bearing socket, said disks being secured to each other along said joining portions; bearing means in each of said bearing socket formations, said bearing means each including an outer race and an inner race providing radial and thrust bearing surfaces with a plurality of ball bearing elements therebetween, each said outer race being pressed into the corresponding bearing socket against the shoulder thereof; a tubular sleeve with ends disposed about the cylindrical extensions on said bearing socket formations of the disks and bearing outwardly against the bearing sockets in substantial alignment with the balls of the two bearings to hold the sockets in spaced relation; and an inner race retaining sleeve extending through said inner races to retain them in position.

2. A wheel for juvenile vehicles and the like comprising a pair of similarly shaped, outwardly dished sheet metal side disks joined to each other on their inner sides adjacent rim formations thereon; each of said disks having a flat joining portion concentric to the wheel axis, a rim flange extending outwardly from the outer circumference of the said joining portion, an inwardly extended bearing socket formed in the center portion of the disk having a cylindrical side wall and a centrally apertured shoulder, said shoulder being provided with an integrally formed inward cylindrical extension about the aperture of said shoulder, and a web connecting the said joining portion to said bearing socket, said disks being secured to each other along said joining portions; bearing means in each of said bearing sockets, said bearing means each including an outer race and an inner race providing radial and thrust bearing surfaces with a plurality of ball bearing elements therebetween, each said outer race being pressed into the corresponding bearing socket against the shoulder thereof; a tubular sleeve with ends disposed about the cylindrical extensions on said bearing socket formations of the disks and bearing outwardly against the bearing sockets in substantial alignment with the balls of the two bearings to hold the sockets in spaced relation; and an inner race retaining sleeve extending through said inner races, said sleeve having a spaced pair of circumferential ridges against which said inner races bear inwardly and having its ends flared outwardly against said inner races to retain them in position.

ALVIN P. DOUGLAS.
LEONARD J. WALTERS.

References Cited in the file of this patent

UNITED STATES PATENTS

| Number | Name | Date |
|---|---|---|
| 1,303,235 | Benson | May 13, 1919 |
| 1,359,506 | Hoerle | Nov. 23, 1920 |
| 1,448,312 | Nauts | Mar. 13, 1923 |
| 1,473,399 | Choate | Nov. 6, 1923 |
| 1,518,411 | Roe | Dec. 9, 1924 |
| 1,973,747 | Bukolt | Sept. 18, 1934 |
| 2,173,584 | Frank | Sept. 19, 1939 |
| 2,327,044 | Horn | Aug. 17, 1943 |

FOREIGN PATENTS

| Number | Country | Date |
|---|---|---|
| 576,128 | France | 1924 |